United States Patent
Sarkar et al.

(10) Patent No.: US 10,613,540 B2
(45) Date of Patent: Apr. 7, 2020

(54) METHOD AND SYSTEM FOR AUTONOMOUSLY STEERING A VEHICLE IN A REVERSE PATH IN REAL-TIME

(71) Applicant: WIPRO LIMITED, Bangalore (IN)

(72) Inventors: Manas Sarkar, Kolkata (IN); Balaji Sunil Kumar, Bengaluru (IN); Shyam Sundar Pal, Kolkata (IN)

(73) Assignee: Wipro Limited, Bangalore (IN)

(*) Notice: Subject to any disclaimer, the term of this patent is extended or adjusted under 35 U.S.C. 154(b) by 120 days.

(21) Appl. No.: 15/848,234

(22) Filed: Dec. 20, 2017

(65) Prior Publication Data
US 2019/0138017 A1    May 9, 2019

(30) Foreign Application Priority Data

Nov. 7, 2017   (IN) .............................. 201741039591

(51) Int. Cl.
*G05D 1/02* (2020.01)
*B62D 15/02* (2006.01)
*B62D 6/00* (2006.01)

(52) U.S. Cl.
CPC .......... *G05D 1/0214* (2013.01); *B62D 6/002* (2013.01); *B62D 15/021* (2013.01); *B62D 15/0265* (2013.01); *B62D 15/0285* (2013.01); *G05D 1/024* (2013.01); *G05D 1/0255* (2013.01); *G05D 2201/0213* (2013.01)

(58) Field of Classification Search
CPC .... G05D 1/024; G05D 1/0214; G05D 1/0255; G05D 2201/0213; B62D 15/021; B62D 15/0265; B62D 15/0285; B62D 6/002
See application file for complete search history.

(56) References Cited

U.S. PATENT DOCUMENTS

| 8,205,704 B2 | 6/2012 | Kadowaki et al. |
| 2014/0058611 A1 | 2/2014 | Borinato |

(Continued)

FOREIGN PATENT DOCUMENTS

DE    10041381 A1    4/2001

OTHER PUBLICATIONS

Extended European Search Report issued in the European Patent Office in counterpart European Application No. 17210144.6, dated Jul. 17, 2018, 9 pages.

*Primary Examiner* — Aaron L Troost
(74) *Attorney, Agent, or Firm* — Finnegan, Henderson, Farabow, Garrett & Dunner, LLP (57) ABSTRACT

The present disclosure discloses method and an autonomous navigation system for autonomously steering a vehicle in a reverse path in real-time. The method comprises instructing to terminate steering of the vehicle in a forward path when a forward steering angle calculated between an orientation of the vehicle and a direction of the forward path is more than a predefined threshold value, calculating a reverse steering angle based on the forward steering angle for steering the vehicle in a reverse path, receiving data of one or more obstacles in the reverse path, determining a distance for steering the vehicle in the reverse path based on the one or more obstacles and the reverse steering angle and instructing the vehicle to steer in the reverse path at the reverse steering angle for the distance. Thus, the present disclosure provides an efficient and simple method for maneuvering obstacles in the forward path.

21 Claims, 10 Drawing Sheets

(56) References Cited

U.S. PATENT DOCUMENTS

| | | | |
|---|---|---|---|
| 2015/0151789 A1 | 6/2015 | Lee et al. | |
| 2016/0107690 A1* | 4/2016 | Oyama | B62D 15/0285 |
| | | | 701/41 |
| 2018/0057057 A1* | 3/2018 | Iwami | B60W 30/06 |
| 2018/0061241 A1* | 3/2018 | Iwami | B62D 15/027 |

* cited by examiner

METHOD AND SYSTEM FOR AUTONOMOUSLY STEERING A VEHICLE IN A REVERSE PATH IN REAL-TIME

TECHNICAL FIELD

The present disclosure relates to automobile industry. Particularly, but not exclusively, the present disclosure relates to autonomous steering of a vehicle in a reverse path in real-time.

BACKGROUND

An autonomous vehicle (driverless vehicle) uses various sensors to navigate through a path. Also, various techniques are used to detect obstacles in the surroundings of the vehicle. The autonomous vehicle has a central control unit that helps the vehicle to traverse a path to reach a destination location from a source location. Also, the central control unit detects any obstacles and maneuvers the obstacles by traversing the vehicle in an alternate path. In few scenarios, when an obstacle is detected by the vehicle, a velocity at which the vehicle is travelling may not provide enough space to easily manoeuvre the obstacle. Here, the velocity may be an angular velocity of the vehicle. Also, when a path in which the vehicle is traveling has a steep curve, the vehicle may not be able to traverse the curve easily, and manual intervention may be required in such circumstances. Thus, existing autonomous vehicles does not provide an efficient solution to address the above-mentioned problems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for autonomously steering a vehicle in a reverse path in real-time. The method comprises instructing, by an Electronic Control Unit (ECU) of a vehicle, to terminate steering of the vehicle in a forward path when a forward steering angle calculated between an orientation of the vehicle and a direction of the forward path is more than a predefined threshold value. The method further comprises calculating a reverse steering angle based on the forward steering angle for steering the vehicle in a reverse path, receiving data of one or more of one or more obstacles in the reverse path, determining a distance for steering the vehicle in the reverse path based on the one or more obstacles and the reverse steering angle and instructing the vehicle to steer in the reverse path at the reverse steering angle for the distance.

In an embodiment, the present disclosure relates to an Electronic Control Unit (ECU) for steering a vehicle in a reverse path in real-time. The ECU is configured to instruct a vehicle to terminate steering in a forward path when a forward steering angle calculated between an orientation of the vehicle and a direction of the forward path, is more than a predefined threshold value, calculate a reverse steering angle based on the forward steering angle for steering the vehicle in a reverse path, receive data of one or more obstacles in the reverse path from one or more sensors associated with the ECU, determine a distance for steering the vehicle in the reverse path based on the one or more obstacles and the reverse steering angle and instruct the vehicle to steer in the reverse path at the reverse steering angle for the distance.

In an embodiment, the present disclosure relates to an autonomous navigation system for steering a vehicle in a reverse path in real-time. The autonomous navigation system comprises one or more sensors to detect one or more obstacles in the reverse path and an Electronic Circuit Unit (ECU). The ECU is configured to instruct a vehicle to terminate steering in a forward path when a forward steering angle calculated between an axis of the vehicle and an axis of the forward path, is more than a predefined threshold value, calculate a reverse steering angle based on the forward steering angle for steering the vehicle in a reverse path, receive data of to the one or more obstacles in the reverse path from one or more sensors associated with the ECU, determine a distance for steering the vehicle in the reverse path based on the one or more obstacles and the reverse steering angle and instruct the vehicle to steer in the reverse path at the reverse steering angle for the distance.

In yet another embodiment, a non-transitory computer-readable storage medium is disclosed. The non-transitory computer-readable storage medium has instructions stored thereon, causing an autonomous navigation system that includes one or more processors to perform steps that include instructing a vehicle to terminate steering in a forward path when a forward steering angle calculated between an axis of the vehicle and an axis of the forward path, is more than a predefined threshold value, calculating a reverse steering angle based on the forward steering angle for steering the vehicle in a reverse path, receive data of to the one or more obstacles in the reverse path from one or more sensors associated with the ECU, determining a distance for steering the vehicle in the reverse path based on the one or more obstacles and the reverse steering angle and instruct the vehicle to steer in the reverse path at the reverse steering angle for the distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to autonomous navigation of a vehicle in a reverse path. An autonomous navigation system of a vehicle detects an obstacle in a forward path and instructs the vehicle to terminate steering in the forward path. Further, the system calculates a reverse steering angle and a distance in a reverse path for steering the vehicle in the reverse path at the reverse steering angle. Upon steering the vehicle in the reverse path, when the system determines that the vehicle can manoeuvre the obstacle in the forward path, the system instructs the vehicle to be steered in the forward path.

Figure 1:
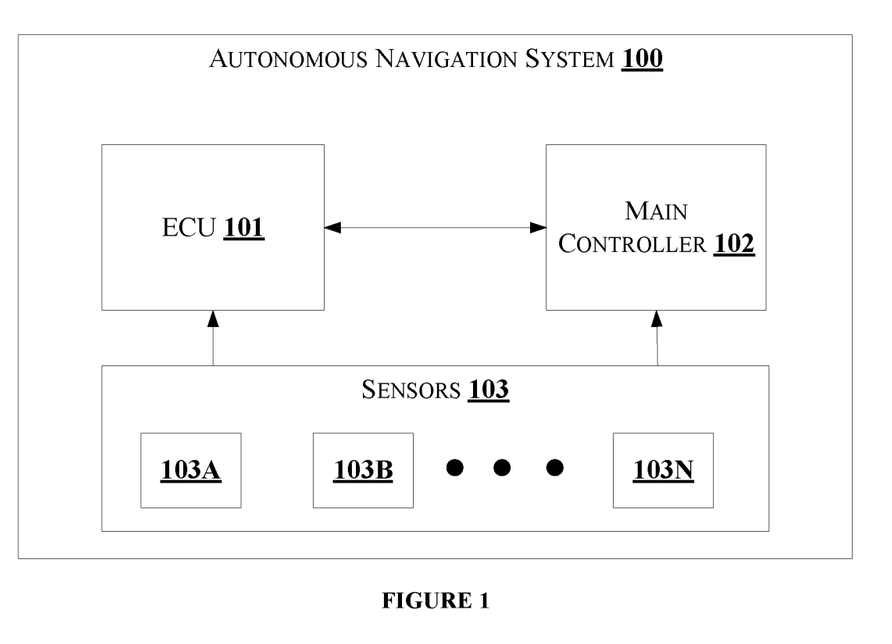
FIG. 1 is illustrative of an exemplary block diagram of an autonomous navigation system for autonomously steering a vehicle in a reverse path, in accordance with some embodiments of the present disclosure.

FIG. 1 shows an exemplary block diagram of an autonomous navigation system 100 for autonomously steering a vehicle in a reverse path, in accordance with some embodiments of the present disclosure. The autonomous navigation system 100 comprises an Electronic Control Unit (ECU) 101, a main controller 102, a sensor 103A, a sensor 103B, . . . , a sensor (103N). In an embodiment, the sensor 103A, the sensor 103B, . . . the sensor 103N may be collectively represented as one or more sensors 103 henceforth in the present disclosure. In an embodiment, the main controller 102 may be used for autonomously navigating the vehicle in a forward path. In an embodiment, the ECU 101 may be used for autonomously navigating the vehicle in a reverse path. In an embodiment, the ECU 101 may be integrated with the main controller 102 or may be a stand-alone unit associated with the main controller 102. The ECU 101 may receive an information regarding an obstacle or curvature of the forward path from the main controller 102, when the vehicle is moving at a certain velocity. The ECU 101 may further receive an information regarding forward steering angle form the main controller 102. The forward steering angle may be an angle calculated between an orientation of the vehicle and a direction of the forward path. For example, the forward path may be a path mapped by the main controller 102 to navigate the vehicle from a source location to a destination location. In an embodiment, the forward path may be a straight path, a curved path or any other path based on obstacles in the forward path. For example, if an obstacle is present, the path mapped by the main controller 102 to manoeuvre the obstacle becomes the forward path. The ECU 101 may receive the forward steering angle calculated by the main controller 102, at predefined intervals of time. Further, the ECU 101 compares the forward steering angle with a predefined threshold value. If the forward steering angle is less than the predefined threshold value, then the ECU 101 may instruct the main controller to manoeuvre the vehicle to traverse the forward path having at least one of the obstacle or a curvature. If the forward steering angle is more than the predefined threshold value, then the ECU 101 immediately instructs the main controller 102 to terminate steering the vehicle in the forward path. The forward angle being more than the threshold value indicates that the vehicle moving at the certain velocity cannot manoeuvre the forward path without moving in the reverse path. Thus, the ECU 101 calculates a reverse steering angle based on the forward steering angle. Then, the ECU 101 receives information about obstacles present in the reverse path from the one or more sensors 103. Further, the ECU 101 determines a distance available for the vehicle to move in the reverse path. Thereafter, the ECU 101 configures the vehicle to move in the reverse path for the distance at the reverse steering angle. As the vehicle moves in the reverse path, the ECU 101 may receive the forward steering angle at the predefined intervals and monitors if the forward steering angle is less than the predefined threshold value. When the forward steering angle is less than the predefined threshold value, the ECU 101 ceases steering the vehicle in the reverse path and instructs the main controller 102 to steer the vehicle in the forward path to manoeuvre the obstacle present in the forward path.

In an embodiment, the one or more sensors 103 may include, but are not limited to, a Light Ranging and Detection (LIDAR) system, an ultrasound sensor, a camera, a proximity sensor and the like.

Figure 2:
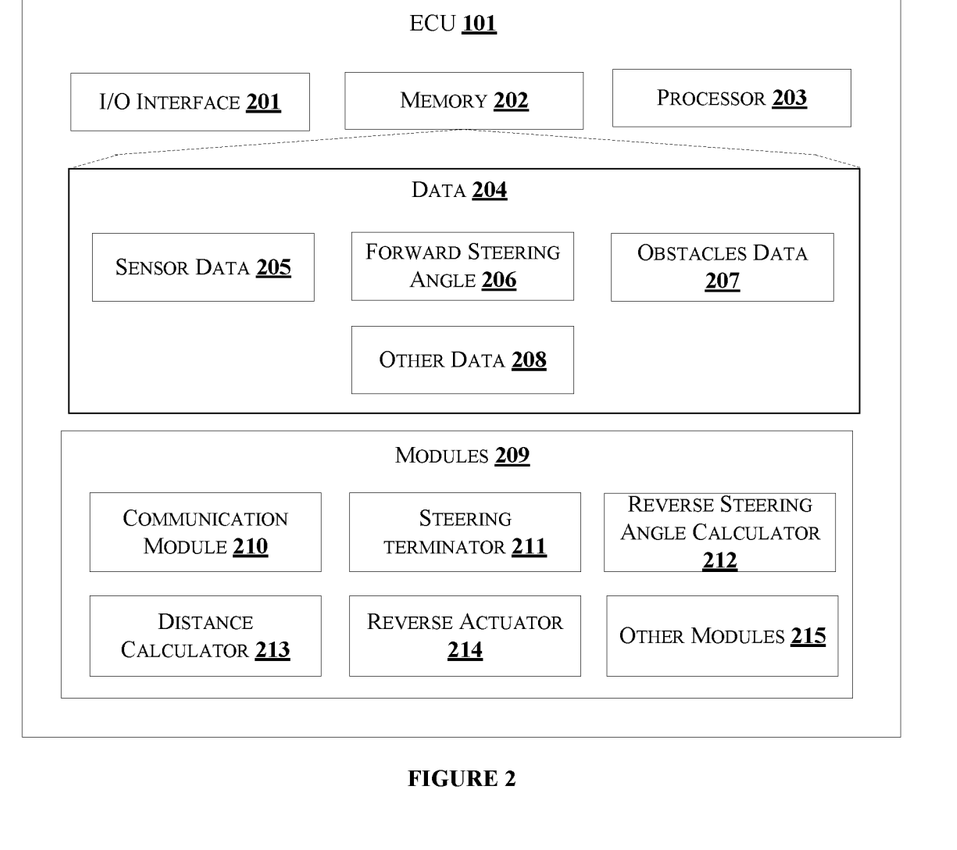
FIG. 2 is a block diagram of internal architecture of an ECU configured to autonomously steer a vehicle in a reverse path, in accordance with some embodiments of the present disclosure.

FIG. 2 illustrates internal architecture of the ECU 101 in accordance with some embodiments of the present disclosure. The ECU 101 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The ECU 101 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, a sensor data 205, a forward steering angle 206, obstacles data 207, and other data 208.

In an embodiment, the sensor data 205 may include information on obstacles present in the reverse path. The one or more sensors 103 detects any obstacles in the reverse path and provides information regarding the obstacles to the ECU 101. For example, the one or more sensors 103 may detect a wall or a divider as an obstacle. In another embodiment, the one or more sensors 103 may detect a person or another vehicle as an obstacle.

In an embodiment, the forward steering angle 206 may be an angle calculated between orientation of the vehicle and a direction of the forward path. The forward steering angle 206 may be used to determine if the vehicle travelling at the certain velocity can manoeuvre any obstacles in the forward path.

In an embodiment, the obstacles data 207 may indicate information on one or more obstacles present in the forward path. For example, the one or more obstacles in the forward path may be a wall or a divider. In another embodiment, the one or more obstacles may be a person or another vehicle. Also, the obstacles data may comprise distance of the vehicle from the obstacles. For example, the one or more sensors 103 may indicate that an obstacle is present at a distance of 10 meters from the vehicle.

In an embodiment, the other data 208 may comprise but is not limited to traffic information, terrain information, and the like.

In an embodiment, the data 204 in the memory 202 is processed by modules 209 of the ECU 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 209 when configured with the functionality defined in the present disclosure will result in a novel hardware.

In one implementation, the modules 209 may include, for example, a communication module 210, a steering terminator 211, a reverse steering angle calculator 212, a distance calculator 213, a reverse actuator 214 and other modules 215. It will be appreciated that such aforementioned modules 209 may be represented as a single module or a combination of different modules.

The communication module 210 helps in communication between the ECU 101 and other units (not shown in figures) of the vehicle. In an embodiment, the other units may comprise, but are not limited to, a transmission control unit, door unit, a steering controller, an indication unit, etc. For example, the communication module 210 may receive obstacles data 207 and forward steering angle 206 from the main controller 102. Also, the communication module 210 may convey instructions to the main controller 102. In an embodiment, the communication module 210 may receive sensor data 205 from the one or more sensors 103. Also, the communication module 210 may communicate instructions to the one or more sensors 103 regarding activation and deactivation of the one or more sensors 103.

In an embodiment, the steering terminator 211 may receive the obstacles data 207 and the forward steering angle 206 from the communication module 210. Further, the steering terminator 211 may generate a first signal for terminating steering of the vehicle in the forward path based on the obstacles data and the forward steering angle 206. The signal may be provided to the communication module 210 for communicating to the main controller 102. In an embodiment, the steering terminator 211 may receive the sensor data 205 from the communication module 210. The sensor data 205 indicates the obstacles present in the reverse path. When distance between the vehicle and the obstacles is less than a predefined distance, the steering terminator 211 generates a second signal for terminating steering of the vehicle in the reverse path. In an embodiment, the steering terminator 211 receives the forward steering angle at predefined time intervals while the vehicle is steered in the reverse path. When the forward steering angle is less than the predefined threshold, the steering terminator generates a third signal to terminate steering of the vehicle in the reverse path.

In an embodiment, the reverse steering angle calculator 212 receives the forward steering angle 206 and calculates the reverse steering angle based on the forward steering angle 206. In an embodiment, the reverse steering angle may be a percentage of the forward steering angle. For example, the reverse steering angle may be 50% of the forward steering angle. Thus, if the forward steering angle is 30°, then, the reverse steering angle may be 15°. When the vehicle is steered in the reverse path at the reverse steering angle, the vehicle may manoeuvre the obstacle in the forward path.

In an embodiment, the distance calculator 213 may receive the obstacles data 207. The obstacles data 207 may be used to determine the distance available for the vehicle to move in the reverse direction. The distance calculator 213 may calculate the distance in real-time based on detection of obstacles by the one or more sensors 103.

In an embodiment, the reverse actuator 214 may receive the reverse steering angle and the distance from the reverse steering angle calculator 212 and the distance calculator 213 respectively. Further, the reverse actuator 214 moves the vehicle in the revere path for the calculated distance at the reverse steering angle. As the vehicle is moved, the forward steering angle 206 is monitored. When the forward steering angle 206 becomes less than the predefined threshold value, the steering terminator 211 provides signals to the reverse actuator to terminate the steering of the vehicle in the reverse path. The forward steering angle indicates turning capability of the vehicle 400 to manoeuvre the obstacle in the forward path. Also, the reverse actuator 214 receives the distance from the distance calculator 213 in real-time. As the vehicle is steered in the reverse path, the vehicle may encounter new obstacles. The distance calculator 213 may dynamically calculate a new distance based on the new obstacles, and provide the new distance to the reverse actuator 214 for steering the vehicle in the reverse path. Further, the reverse actuator 214 may provide control to the main controller 102 to move the vehicle in the forward path.

In an embodiment, the other modules 215 may include, but is not limited to, an indication module to indicate when the vehicle is moving in the reverse path, etc.

Figure 3:
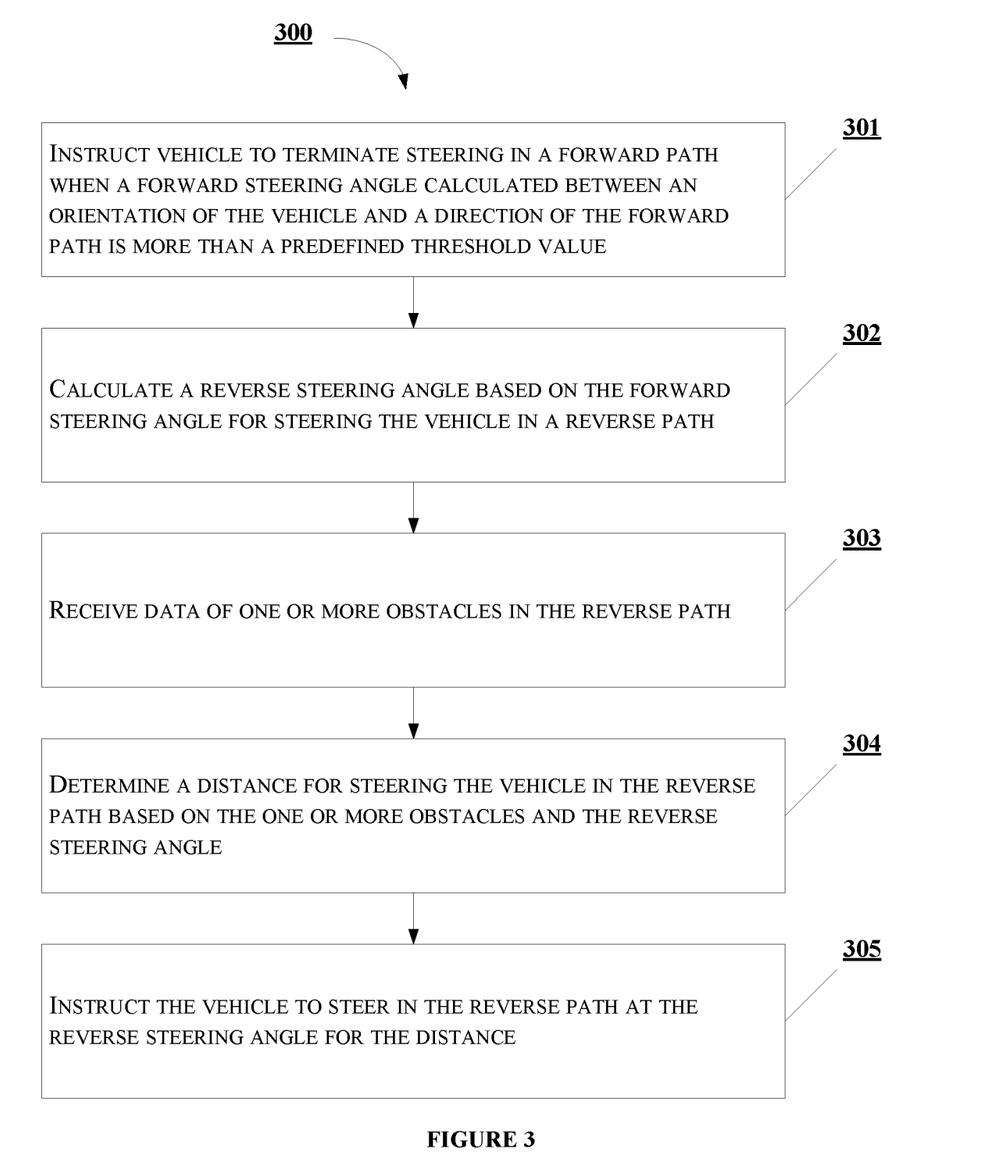
FIG. 3 is illustrative of exemplary method steps for autonomously steering a vehicle in a reverse path, in accordance with some embodiments of the present disclosure.

FIG. 3 shows a flow chart illustrating a method for autonomously steering the vehicle in the reverse path, in accordance with some embodiments of the present disclosure.

As illustrated in FIG. 3, the method 300 may comprise one or more steps for autonomously steering the vehicle in the reverse path, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the steering terminator 211 receives the forward steering angle 206 from the communication module 210. When the forward steering angle 206 is more than the predefined threshold, the steering terminator 211 generates the first signal to be communicated to the main controller 102 for terminating steering of the vehicle in the forward path. For example, let us consider that the predefined threshold value is 35°. When the forward steering angle 206 is more than 35°, the steering terminator 211 generates the first signal for terminating steering of the vehicle in the forward path. In an embodiment, the predefined threshold value may vary based on obstacles of the forward path, curvature of the forward path, etc.

At step 302, the reverse steering angle calculator 212 receives the forward steering angle from the communication module 210. The reverse steering angle calculator 212 calculates a reverse steering angle based on the forward steering angle. The reverse steering angle may be a predefined percentage of the forward steering angle 206. For example, if the forward steering angle is 30°, then the reverse steering angle may be 15°. The reverse steering angle enables the vehicle to reduce the value of the forward steering angle 206. For example, consider that the forward steering angle is 30°, which is greater than the predefined threshold value of 25°. Let the reverse steering angle be 15°. When the vehicle is moved in the reverse path at 15° in a direction opposite to a direction of the forward path, the vehicle may subsequently steer in the forward path easily, reducing the forward steering angle 206.

At step 303, the communication module 210 receives the obstacles data 207 from the one or more sensors 103. In an embodiment, when the reverse steering angle calculation is initiated, the communication module 210 may instruct the one or more sensors 103 to activate and provide the obstacles data 207.

Figure 4:
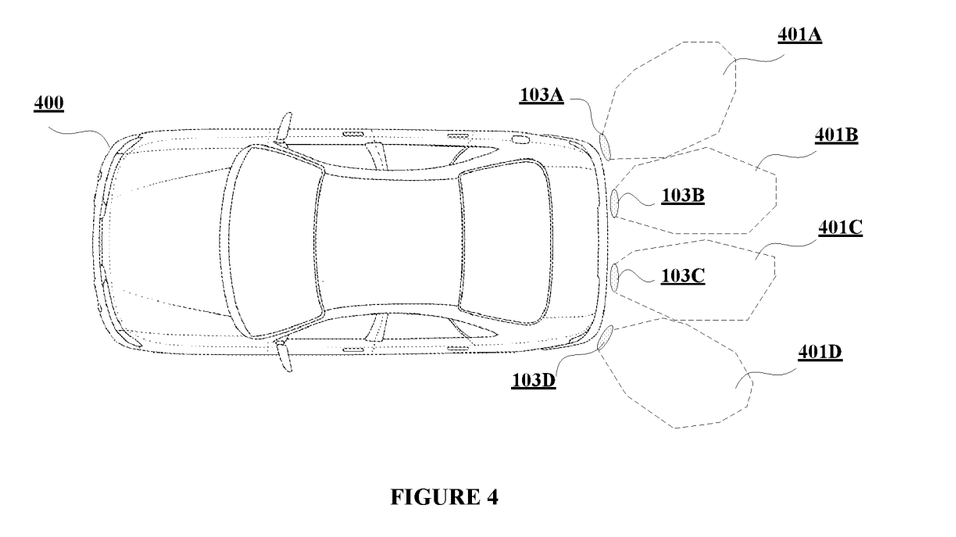
FIG. 4 is an exemplary drawing showing sensors coverage for detecting obstacles in a reverse path, for autonomously steering a vehicle in the reverse path, in accordance with some embodiments of the present disclosure.

At step 304, the distance calculator 213 calculates the distance available for the vehicle to be steered in the reverse path. In an embodiment, the distance is calculated by determining an area covered by each of the one or more sensors 103. Referring now to FIG. 4, four sensors 103A, 103B, 103C and 103D mounted on the vehicle 400, are shown. A sensed area covered by four sensors 103 is shown as 401A, 401B, 401C and 401D. The sensed area 401A, 401B, 401C and 401D may be determined by detection of one or more obstacles by the four sensors. In an instance, let us consider that the sensors 103A, 103B, 103C and 103D may be ultrasound sensors. The four sensors may emit ultrasound signals to detect one or more obstacles. Each of the four sensors may emit a beam of ultrasound signals. The ultrasound signals are reflected when they encounter on obstacle. The reflected beam may be used to determine an area available for the vehicle 400 to be steered in the reverse path.

Figure 5A:
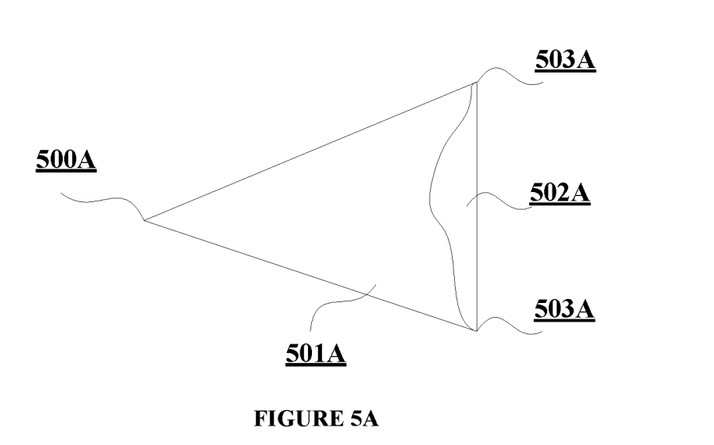
FIG. 5A, FIG. 5B, FIG. 5C and FIG. 5D are indicative of an area available for a vehicle to move in a reverse path, calculated using each sensor, in accordance with some embodiments of the present disclosure.
Figure 5B:
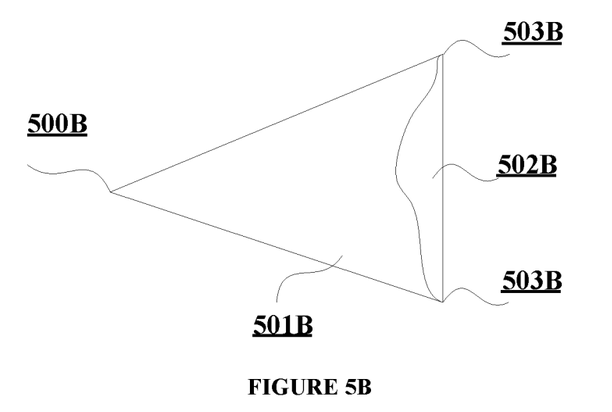
Figure 5C:
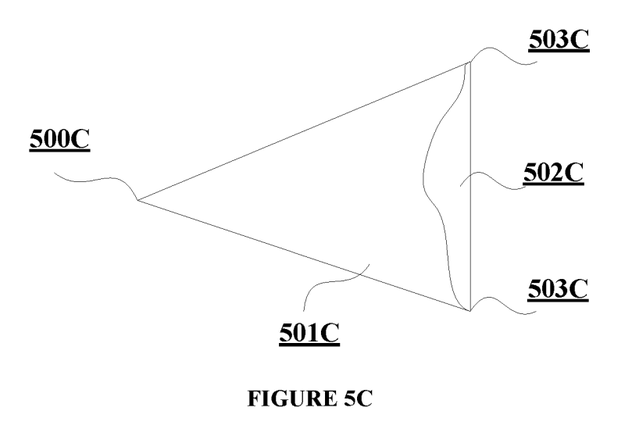
Figure 5D:
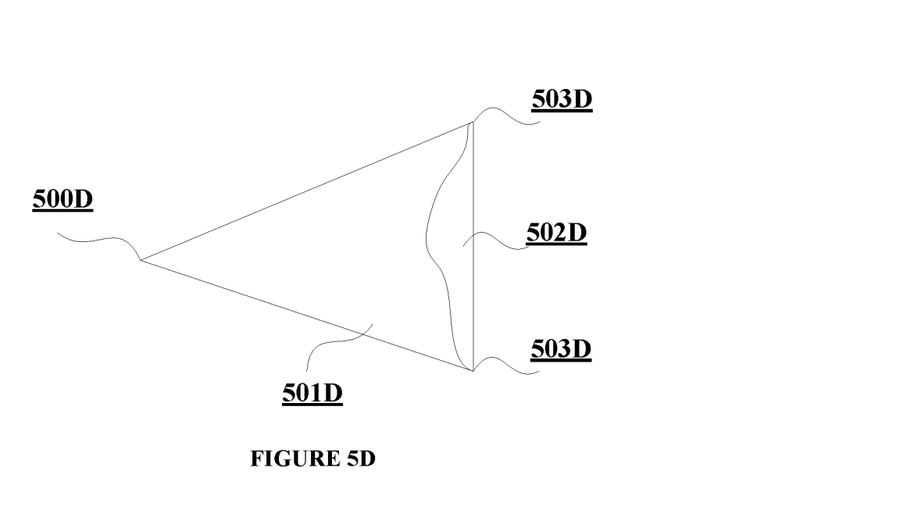

FIG. 5A is indicative of an available area 501A for a vehicle 400 to move in a reverse path. The point 500A is the location from where the one or more sensors 103 emit the ultrasound beams. The two points 503A indicate detection of obstacles by the sensor 103A. Thus, the available area 501A formed by the points 500A, 503A and 503B is the area available for the vehicle 400 to be steered in the reverse path. In an embodiment, a predefined portion 502A of the available area 501A may be reduced. The predefined portion 502A may indicate projection of obstacles towards the vehicle 400. For example, 80% of the total area determined may be considered as available area. Each of the one or more sensors 103 may have different area based on obstacles detected. Thus, the area determined using each of the one or more sensors 103 may be calculated using the formula:

$$\text{Area} = (s1 * s2 * \sin 30)/2 \qquad (1)$$

Where s1 and s2 are distances of the vehicle 400 to one or more obstacles detected by outermost rays (ray on the left side of the beam and ray on the right side of the beam) of the ultrasound beam. FIG. 5A, shows the available area 501A calculated using the sensor 103A. Likewise, FIG. 5B shows an available area 501B using the sensor 103B. FIG. 5C shows an available area 501C calculated using the sensor 103C and FIG. 5D shows an available area 501D calculated using the sensor 103D.

In an embodiment, a total area may be calculated by combining the individual area 501A, 501B, 501C and 501D. The total area may be represented as 501 (not shown in figures). The total area 501 indicates total space available for the vehicle 400 to be steered at the reverse steering angle. In an embodiment, the total area 501 may be calculated at predefined intervals of time, i.e., the total area 501 may be calculated as the vehicle 400 moves in the reverse path. The reverse steering angle and speed at which the vehicle 400 is to be steered in the reverse path may be calculated based on the total area 501 calculated. When one of the area (501A, 501B, 501C and 501D) becomes less than a predefined threshold value, the vehicle 400 terminates to move in the reverse path. Also, after a predefined time duration, the vehicle 400 may terminate moving in the reverse path. In an embodiment, the predefined threshold value of the area may be based on the obstacles detected by the one or more sensors 103.

Figure 5E:
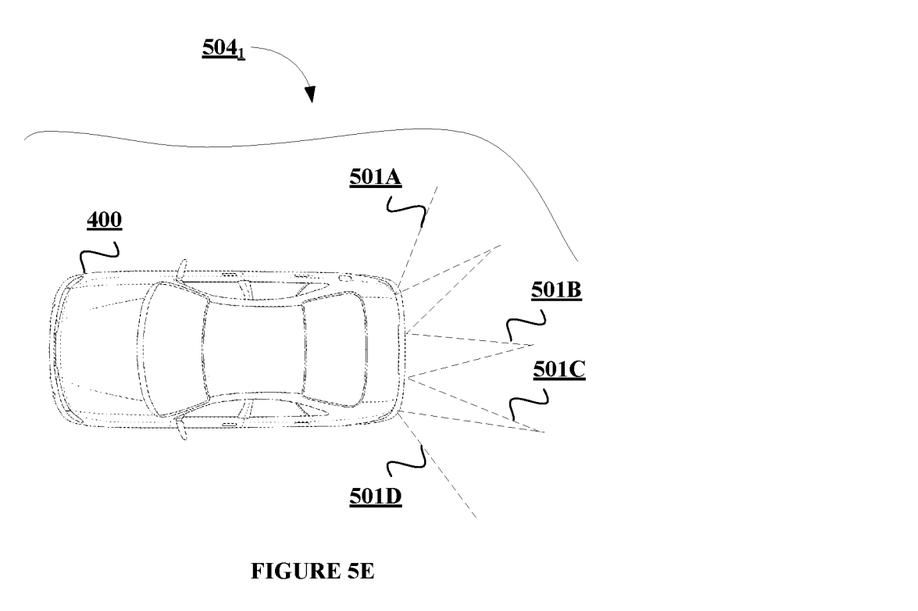
FIG. 5E, FIG. 5F, FIG. 5G are indicative of area calculated by each sensor, when the vehicle approaches an obstacle.

Scenario 1:

Let us assume that the vehicle 400 is in a rest position and has identified an obstacle in the forward path. Also, let the position of the vehicle 400 in this state be described as position 1 $504_1$. Now the vehicle is to be steered in the reverse path to manoeuvre the obstacle. FIG. 5E shows a diagram of the vehicle 400 at rest, which is to be steered in a reverse path. As shown in FIG. 5E, the total area 501 (not shown in figure) is calculated using the four sensors (103A, 103BB, 103C and 103D). Also, the total area 501 is calculated by summing up the area 501A, 501B, 501C and 501D. Area calculated by each of the one or more sensors 103 may indicate an area available to be steered in that direction. The total area 501 indicates total area available for the vehicle 400 to be steered in the reverse path having a predefined speed at the reverse steering angle. In view of FIG. 4, the FIG. 5E, shows the area calculated by each of the one or more sensors 103 is the same. That is, the area 501A, 501B, 501C and 501D are same. Equal area indicates that the vehicle 400 has equal area available to move in a direction of area covered by the sensors 103A, 103B, 103C and 103D.

Scenario 2:

Let us assume that the vehicle 400 has moved in the reverse path for a distance of 5 meters at a reverse steering angle of 12° from position 1 $504_1$. Let the changed position be described as position 2 $504_2$. At position 2 $504_1$, the area is calculated using each of the one or more sensors 103. As seen in the FIG. 5F, the area calculated using the sensor 103A is less than the area calculated in scenario 1. Here, the sensor 103A has detected an obstacle, and hence the area calculated using the sensor 103A is reduced from scenario 1. Whereas, the area calculated using the sensors 103B, 103C and 103D is the same as the area calculated using the said sensors in scenario 1.

Scenario 3:

Let us assume that the vehicle 400 has further moved in the reverse path for a distance of 10 meters from a position as described in scenario 2, at an angle of 22°. The changed position may be denoted as position 3 $504_3$. FIG. 5G shows area calculated using the sensors 103A, 103B, 103C and 103D at position 3 $504_3$. As shown in the FIG. 5G, the area calculated using the sensor 103A has reduced considerably when compared to area calculated using the sensor 103A in scenario 2. Here, the vehicle 400 has moved very close to the obstacle and the sensor 103A is the closest to the obstacle. Let the area calculated at position 3, using the sensor 103A be less than the predefined threshold. Now, the vehicle 400 terminates steering the vehicle in the reverse path. The area being less than the predefined threshold indicates that the vehicle 400 is very close to the obstacle and does not have space to move further in the reverse path. Further, the area calculated using the sensor 103B has also reduced when compared to area calculated using the sensor 103B in scenario 2. The area calculated using the sensors 103C and 103D are the same when compared to the area calculated using the sensor 103C and 103D in scenario 2. Thus, by considering the area calculated by each of the one or more sensors 103, FIG. 5G indicates that the vehicle may not have sufficient space to move in the reverse path at the reverse steering angle of 22° in a direction covered by the sensor 103A and 103B.

Figure 5F:
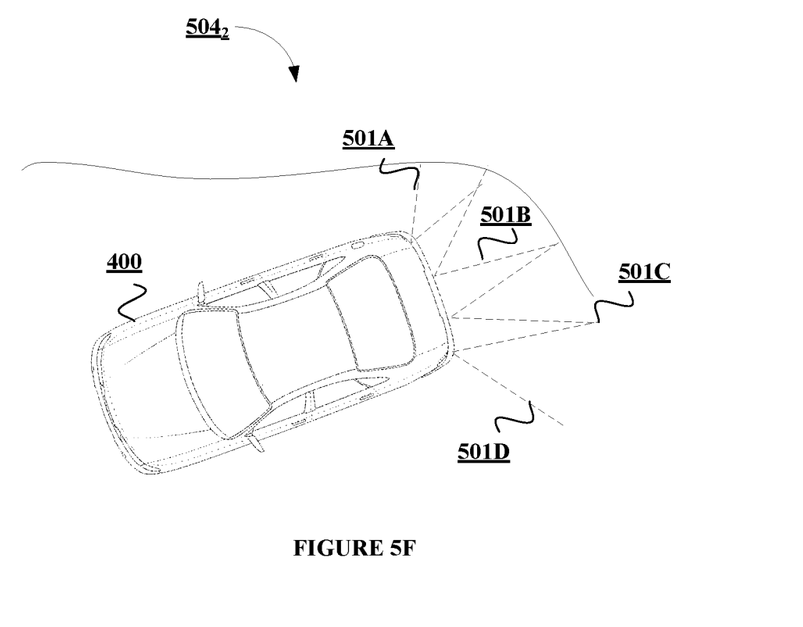
Figure 5G:
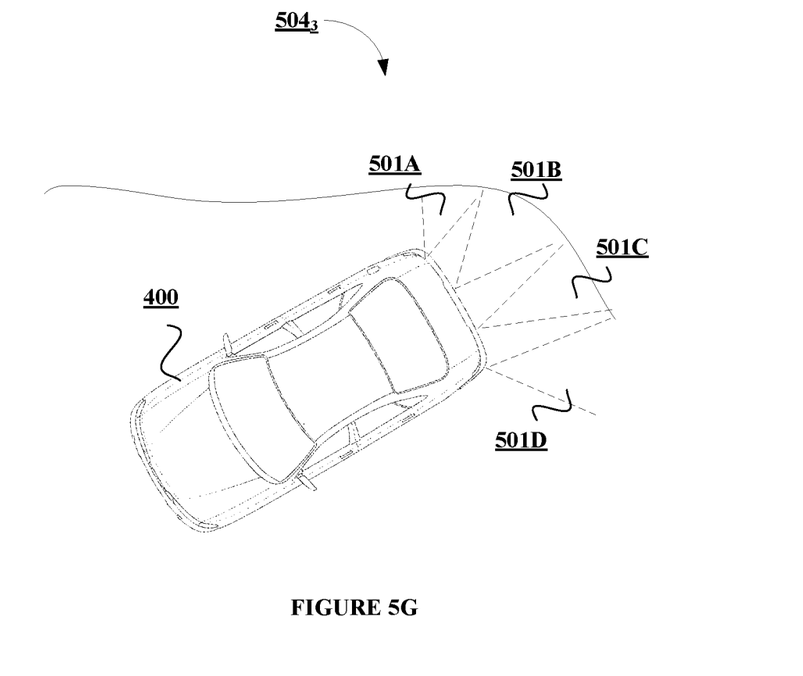

Thus, the FIG. 5E, FIG. 5F and FIG. 5G indicates that the area calculated using each of the one or more sensors 103 are used to determine the distance and reverse steering angle.

In an embodiment, the area calculated using each sensor 103 may vary. Also, the one or more sensors 103 are placed at specific position such that a wide area around the vehicle 400 is covered. In an embodiment, sensitivity of the one or more sensors 103 may vary based on type of obstacle detected. For example, the one or more sensors 103 may detect a wall as an obstacle from a distance of 40 meters, whereas the one or more sensors 103 may detect a person as an obstacle from a distance of 10 meters.

Referring back to step 304, the distance calculator 213 uses the available area to determine the distance available for the vehicle 400 to be steered within the available area at the reverse steering angle.

At step 305, the reverse actuator 214 receives the distance and reverse steering angle from the reverse steering angle calculator 212 and the distance calculator 213 respectively. Further, the reverse actuator 214 generates an actuation signal to steer the vehicle 400 in the reverse path for the distance at the reverse steering angle. The reverse actuator 214 also monitors the forward steering angle 206 while the vehicle 400 is steered in the reverse path. When the forward steering angle becomes less than the predefined threshold, the steering terminator 211 generates the third signal to terminate steering the vehicle 400 in the reverse path. The reverse actuator 214 provides control to the main controller 102 to steer the vehicle in the forward path.

Figure 6:
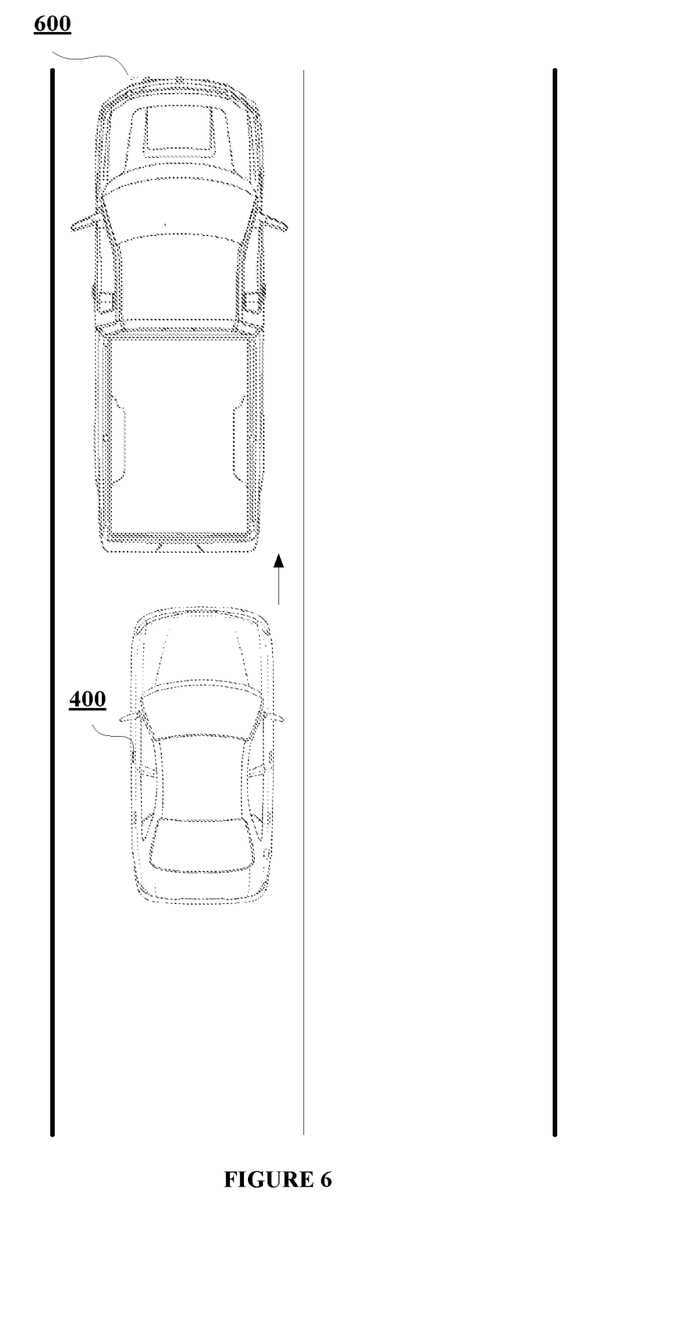
FIG. 6, FIG. 7 and FIG. 8 show an example of a vehicle for maneuvering an obstacle in a forward path, in accordance with some embodiments of the present disclosure.
Figure 7:
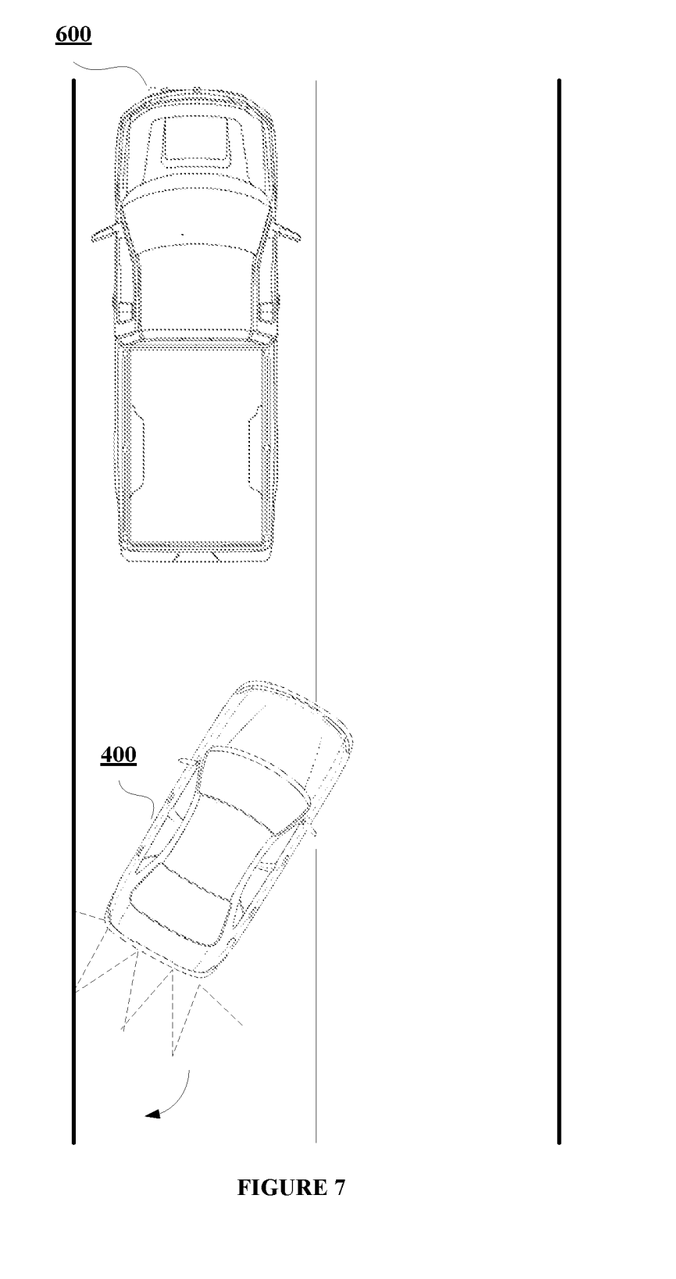
Figure 8:
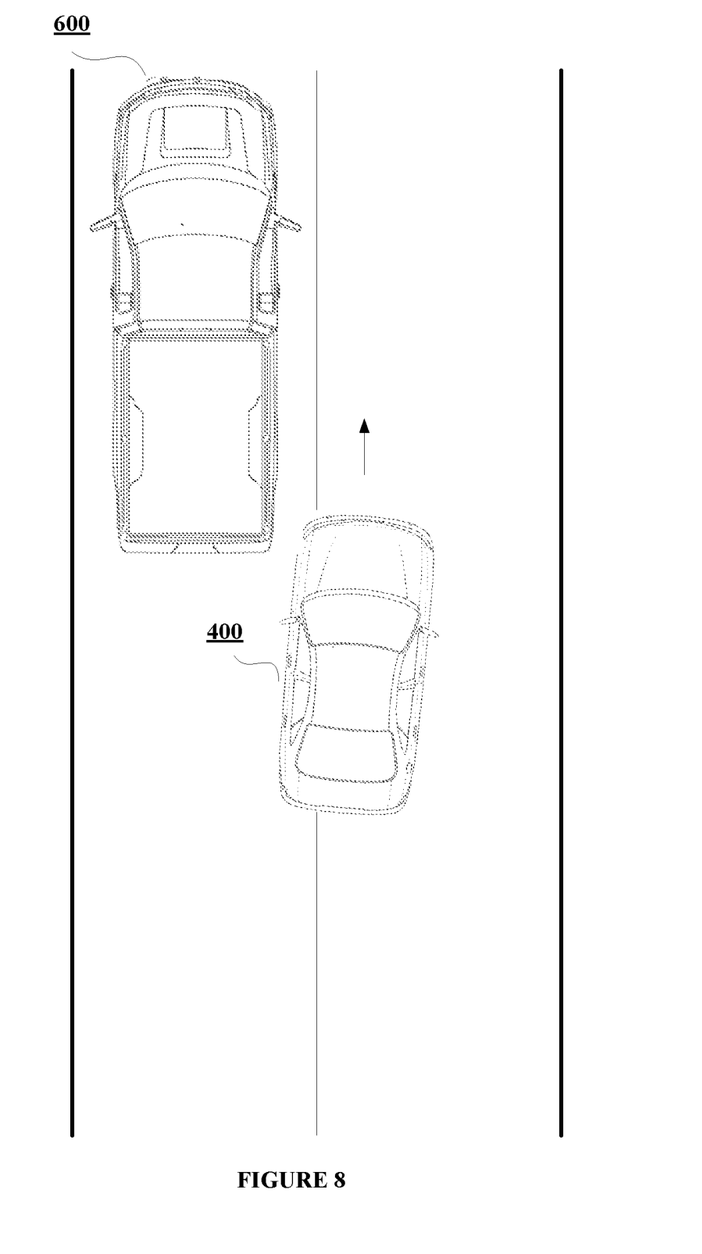

FIG. 6 is an illustration where the vehicle 400 is obstructed by an obstacle 600. As seen from the figure, the vehicle 400 may not go past the obstacle without changing the forward path. A new forward path may be mapped such that the vehicle 400 may traverse around the obstacle 600. However, to traverse the new forward path, if the forward steering angle is more than the predefined threshold, then the ECU 101 determines the reverse steering angle and the distance to be steered in the reverse path. Thereafter, the vehicle 400 is steered in the reverse path for the distance calculated at the reverse steering angle, as shown in FIG. 7. Further, when the forward steering angle becomes less than the predefined threshold value, then the main controller 102 steers the vehicle 400 in the forward path to manoeuvre the obstacle 600, as shown in FIG. 8.

In an embodiment, the one or more sensors 103 may be placed at predefined positions on the vehicle 400. For example, the one or more sensors 103 may be placed at a rear end of the vehicle 400. Further, the one or more sensors may be installed such that each of the one or more sensors is at a predefined angle with an axis of the vehicle. For example, the sensor 103A may be placed at +45° from the axis of the vehicle 400, the sensor 103B may be placed at +15° from the axis of the vehicle 400, the sensor 103C may be placed at −15° from the axis of the vehicle 400, and the sensor 103D may be placed at −45° from the axis of the vehicle 400. The one or more sensors 103 are placed to receive maximum field of view around the vehicle 400. The maximum field of view provides more information about obstacles around the vehicle 400. In an exemplary embodiment, the one or more sensors 103 may detect a big obstacle (for example a truck, a tree and the like) from a distance of 20 m. The one or more sensors 103 may detect small obstacles (person, a rock, and the like) from a distance of 4 m-6 m.

In an embodiment, the method steps 300 is performed in real-time.

In an embodiment, the present disclosure discloses a method and an autonomous navigation system for steering the vehicle in the reverse path. Steering the vehicle in the reverse path is a simple method to manoeuvre obstacles in the forward path.

In an embodiment, the present disclosure discloses a method and an autonomous navigation system for navigating a forward path having a steep curvature.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | Autonomous navigation system |
| 101 | ECU |
| 102 | Main controller |
| 103 | Sensors |
| 201 | I/O Interface |
| 202 | Memory |
| 203 | Processor |
| 204 | Data |
| 205 | Sensor data |
| 206 | Forward steering angle |
| 207 | Obstacles data |
| 208 | Other data |
| 209 | Modules |
| 210 | Communication module |
| 211 | Steering terminator |
| 212 | Reverse steering angle calculator |
| 213 | Distance calculator |
| 214 | Reverse actuator |
| 215 | Other modules |
| 400 | Vehicle |
| 401 | Sensed area of each sensor |
| 600 | Obstacle |

We claim:

1. A method for autonomously steering a vehicle in a reverse path in real-time, comprising:
    instructing, by an Electronic Control Unit (ECU) of a vehicle, to terminate steering of the vehicle in a forward path when a forward steering angle calculated between an orientation of the vehicle and a direction of the forward path is more than a predefined threshold value;
    calculating, by the ECU, a reverse steering angle based on the forward steering angle for steering the vehicle in a reverse path;
    receiving, by the ECU, data of one or more obstacles in the reverse path;
    determining, by the ECU, a distance for steering the vehicle in the reverse path based on the one or more obstacles and the reverse steering angle; and
    instructing, by the ECU, the vehicle to steer in the reverse path at the reverse steering angle for the distance.

2. The method as claimed in claim 1, wherein the forward steering angle indicates one of presence and absence of at least one of an obstacle in the forward path and a curvature of the forward path.

3. The method as claimed in claim 1, wherein the termination is based on angular velocity of the vehicle.

4. The method as claimed in claim 1, wherein a direction of steering the vehicle in the reverse path is opposite to a direction of steering of the vehicle in the forward path.

5. The method as claimed in claim 1, wherein the one or more obstacles are used to determine an available area for steering the vehicle in the reverse path.

6. The method as claimed in claim 1, wherein the reverse steering angle is a predefined percent of the forward steering angle.

7. The method as claimed in claim 5, wherein the available area in the reverse path is used to determine the distance for steering the vehicle in the reverse path at the reverse steering angle.

8. The method as claimed in claim 1, further comprising steering the vehicle in the forward path subsequent to steering the vehicle in the reverse path.

9. An Electronic Control Unit (ECU) for steering a vehicle in a reverse path in real-time, configured to:
    instruct a vehicle to terminate steering in a forward path when a forward steering angle calculated between an orientation of the vehicle and a direction of the forward path, is more than a predefined threshold value;
    calculate a reverse steering angle based on the forward steering angle for steering the vehicle in a reverse path;
    receive data of one or more obstacles in the reverse path from one or more sensors associated with the ECU;
    determine a distance for steering the vehicle in the reverse path based on the one or more obstacles and the reverse steering angle; and
    instruct the vehicle to steer in the reverse path at the reverse steering angle for the distance.

10. The ECU as claimed in claim 9, wherein the forward steering angle indicates one of presence and absence of at least one of an obstacle in the forward path and a curvature of the forward path.

11. The ECU as claimed in claim 9, wherein the termination is based on angular velocity of the vehicle.

12. The ECU as claimed in claim 9, wherein a direction of steering the vehicle in the reverse path is opposite to a direction of steering of the vehicle in the forward path.

13. The ECU as claimed in claim 9, wherein the one or more obstacles are used to determine an available area for steering the vehicle in the reverse path.

14. The ECU as claimed in claim 9, wherein the reverse steering angle is a predefined percent of the forward steering angle.

15. The ECU as claimed in claim 13, wherein the area is used to determine the distance for steering the vehicle in the reverse path at the reverse steering angle in the reverse path.

16. The ECU as claimed in claim 9 is further configured to steer the vehicle in the forward path subsequent to steering the vehicle in the reverse path.

17. An autonomous navigation system for steering a vehicle in a reverse path in real-time, comprising:
    one or more sensors to detect one or more obstacles in the reverse path; and
    an Electronic Circuit Unit (ECU), configured to:
        instruct a vehicle to terminate steering in a forward path when a forward steering angle calculated between an axis of the vehicle and an axis of the forward path, is more than a predefined threshold value;
        calculate a reverse steering angle based on the forward steering angle for steering the vehicle in a reverse path;
        receive data of to the one or more obstacles in the reverse path from one or more sensors associated with the ECU;
        determine a distance for steering the vehicle in the reverse path based on the one or more obstacles and the reverse steering angle; and
        instruct the vehicle to steer in the reverse path at the reverse steering angle for the distance.

18. The autonomous navigation system as claimed in claim 17, wherein the one or more sensors are installed at rear end of the vehicle.

19. The autonomous navigation system as claimed in claim 18, wherein the one or more sensors are at a predefined angle with the axis of the vehicle.

20. The autonomous navigation system as claimed in claim 17, wherein the one or more sensors comprises at least one of a Light Radiation and Ranging (LIDAR) sensor and an ultrasound sensor.

21. A non-transitory computer-readable storage medium is disclosed, the non-transitory computer-readable storage medium has instructions stored thereon, causing an autonomous navigation system that includes one or more processors to perform steps including:
    instructing a vehicle to terminate steering in a forward path when a forward steering angle calculated between an axis of the vehicle and an axis of the forward path, is more than a predefined threshold value;
    calculating a reverse steering angle based on the forward steering angle for steering the vehicle in a reverse path;
    receiving data of to the one or more obstacles in the reverse path from one or more sensors associated with the ECU;
    determining a distance for steering the vehicle in the reverse path based on the one or more obstacles and the reverse steering angle; and
    instructing the vehicle to steer in the reverse path at the reverse steering angle for the distance.

* * * * *